(12) United States Patent
Taylor et al.

(10) Patent No.: US 7,511,222 B2
(45) Date of Patent: Mar. 31, 2009

(54) COLD SHRINK ARTICLE AND METHOD OF USING COLD SHRINK ARTICLE

(75) Inventors: William L. Taylor, Round Rock, TX (US); William V. Dower, Austin, TX (US); Garry L. Sjolander, Pflugerville, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 179 days.

(21) Appl. No.: 11/609,181

(22) Filed: Dec. 11, 2006

(65) Prior Publication Data

US 2008/0135288 A1 Jun. 12, 2008

(51) Int. Cl.
*H01R 4/00* (2006.01)

(52) U.S. Cl. ............... 174/84 R; 174/92; 428/34.9; 29/605

(58) Field of Classification Search ........ 174/74 R, 174/77 R, 84 R, 91, 92, 74 A, 93, 138 F, 174/73.1; 428/36.92, 34.9, 35.1, 36.8; 138/103
See application file for complete search history.

(56) References Cited

U.S. PATENT DOCUMENTS

| | | | | |
|---|---|---|---|---|
| 4,389,440 A | * | 6/1983 | Keith .................. | 428/34.9 |
| 4,506,430 A | * | 3/1985 | Guzay, Jr. ............ | 29/450 |
| 4,647,716 A | | 3/1987 | Akiyama et al. | |
| 4,915,990 A | * | 4/1990 | Chang ................. | 428/34.9 |
| 5,070,597 A | * | 12/1991 | Holt et al. ............ | 29/887 |
| 5,280,136 A | * | 1/1994 | Yaworski et al. ...... | 174/73.1 |
| 5,373,616 A | * | 12/1994 | Biersdorf et al. ..... | 29/235 |
| 5,670,223 A | | 9/1997 | Sadlo et al. | |
| 5,746,253 A | * | 5/1998 | Dust et al. ........... | 138/178 |
| 5,753,861 A | * | 5/1998 | Hansen et al. ........ | 174/93 |
| 5,755,465 A | | 5/1998 | Stewart, Jr. et al. | |
| 5,801,332 A | * | 9/1998 | Berger et al. ......... | 174/73.1 |
| 5,844,170 A | * | 12/1998 | Chor et al. .......... | 174/74 A |
| 5,922,423 A | * | 7/1999 | Jeremko .............. | 428/34.9 |
| 5,925,427 A | * | 7/1999 | Sadlo et al. .......... | 428/34.1 |
| 6,015,629 A | * | 1/2000 | Heyer et al. ......... | 428/625 |
| 6,103,975 A | * | 8/2000 | Krabs et al. ......... | 174/74 A |
| 6,359,226 B1 | | 3/2002 | Biddell et al. | |

(Continued)

FOREIGN PATENT DOCUMENTS

EP 0 780 949 B1 6/1997

OTHER PUBLICATIONS

Standard: *UL486D Testing for Underground Connectors*, 5 pages.

(Continued)

*Primary Examiner*—William H Mayo, III
(74) *Attorney, Agent, or Firm*—Dean M. Harts; Melanie G. Gover

(57) ABSTRACT

An article can include a protective core having two end portions. The article can include a number of support cores. Each support core can be positioned substantially adjacent each end portion of the protective core. The article can include a cold shrinkable material held in an expanded state over at least a portion of the protective core and at least a portion of each support core. The support cores, the protective core, and the cold shrinkable material can collectively be placed over an apparatus such that the cold shrinkable material tightens over a portion of the apparatus responsive to removing the support core from the cold shrinkable material.

39 Claims, 7 Drawing Sheets

U.S. PATENT DOCUMENTS

| | | | | |
|---|---|---|---|---|
| 6,472,600 | B1 * | 10/2002 | Osmani et al. | 174/75 R |
| 6,762,364 | B2 * | 7/2004 | Hofmann et al. | 174/84 R |
| 6,911,596 | B2 * | 6/2005 | Ohtsubo et al. | 174/36 |
| 7,304,242 | B1 * | 12/2007 | Dower et al. | 174/74 R |
| 7,351,908 | B2 * | 4/2008 | Wentzel et al. | 174/36 |
| 2003/0124285 | A1 * | 7/2003 | Hopcus et al. | 428/36.9 |

OTHER PUBLICATIONS

Product Catalog: *Homac's Hub System*, The Homac Companies, (2005), pp. 25-35.

Product Catalog: *Radiating Splice*, The Homac Companies, (2005), pp. 36-42.

Product Literature: *Cold Shrink Rubber Coax Seal Kits CS-1*, 3M Electrical Products Division, (1994), 2 pages.

Product Literature: *Cold Shrink QS2013-3T-WS Trifurcating Transition Splice Kit*, 3M Electrical Products Division, (1998), pp. 1-20.

Product Literature: *Cold Shrink Three-Conductor Splice Kit QS-III*, 3M Electrical Products Division, (2005), pp. 1-12.

Data Sheet: *ScotchcastTM Flexible Power Cable Splicing Kits 82-F and 82-BF Series*, 3M, (2002), 2 pages.

Product Information: *Coax Seal Kit*, 3M Electrical Products Division, (2002), 1 page.

* cited by examiner

COLD SHRINK ARTICLE AND METHOD OF USING COLD SHRINK ARTICLE

BACKGROUND

Cold shrink articles are generally conventional products used to seal or otherwise protect an apparatus such as a cable or splice. Some embodiments of existing cold shrink articles operate such that a cold shrinkable material is held in an expanded or stretched state over a support core such as a removable ribbon core. When the support core or ribbon is unwound and removed from supporting the cold shrinkable material, the cold shrinkable material shrinks in diameter and tightly fits onto the outer surface of an apparatus.

SUMMARY

Various exemplary embodiments of the article can include a protective core having two end portions. The article can also include a number of support cores. Each support core can be positioned substantially adjacent each end portion of the protective core. The article can also include a cold shrinkable material held in an expanded state over at least a portion of the protective core and at least a portion of each support core. The support cores, the protective core, and the cold shrinkable material can collectively be placed over an apparatus such that the cold shrinkable material tightens over a portion of the apparatus responsive to removing the support core from the cold shrinkable material. Various embodiments can also include methods of using the article.

Alternative various embodiments of the article can include a protective core having two end portions. The article can also include a support core positioned substantially adjacent a first end portion of the protective core. The article can also include a cold shrinkable material held in an expanded state over at least a portion of the support core and surrounding the first end portion of the protective core to define an open end portion of the article. The cold shrinkable material can surround and enclose a second end portion of the protective core to define a closed end portion of the article. The cold shrinkable material, the support core, and the protective core can collectively receive an apparatus through the open end of the article such that the cold shrinkable material tightens over a portion of the apparatus responsive to removing the support core from the cold shrinkable material. Various embodiments can also include methods of using the article.

It is desirable in the art to introduce an article that maintains cold shrinkable sealing advantages, while also protecting the cold shrinkable material from exposure to unique and non-uniform shapes such as sharp edges or other deformations that may exist on a particular apparatus to be sealed.

DETAILED DESCRIPTION

Figure 1:
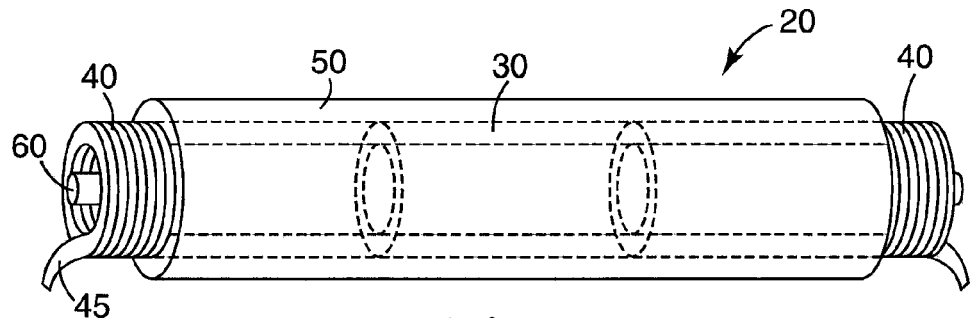
FIG. 1 is an isometric view of an article prior to operation according to an embodiment of the invention.
Figure 2:
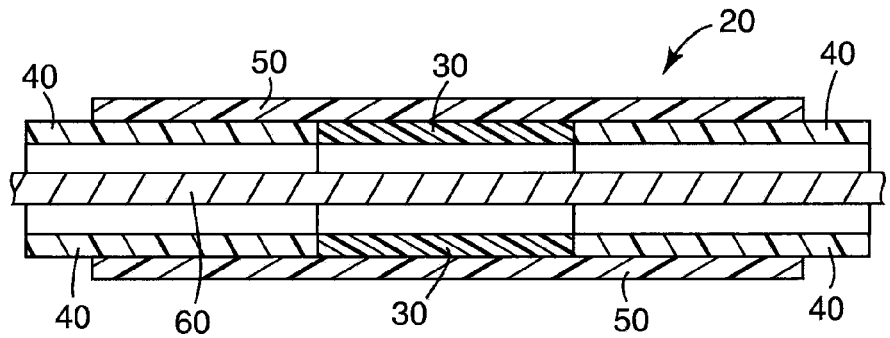
FIG. 2 is a sectional view of the article of FIG. 1.
Figure 3:
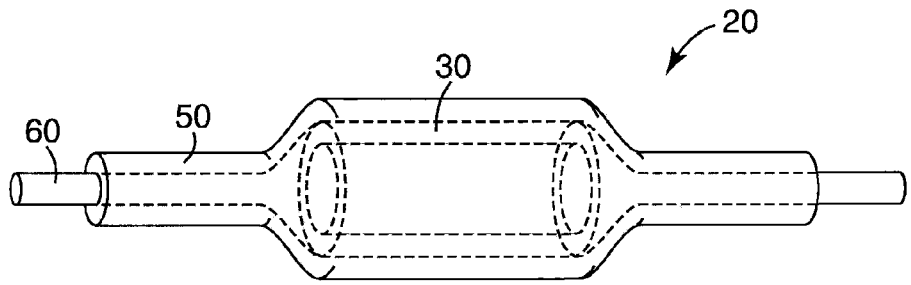
FIG. 3 is an isometric view of an article upon operation according to an embodiment of the invention.
Figure 4:
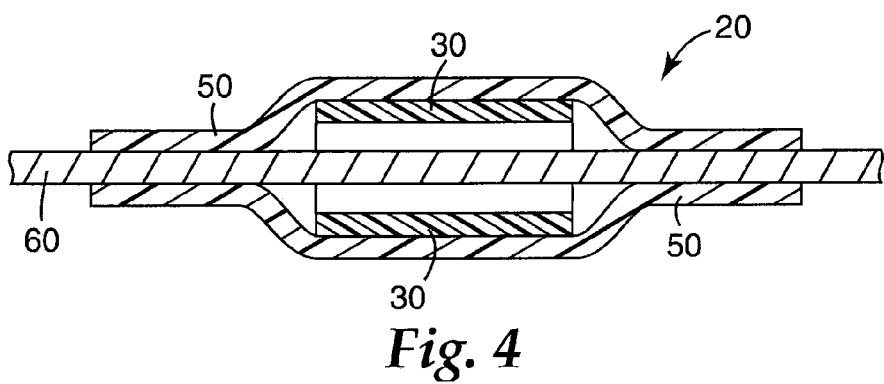
FIG. 4 is a sectional view of the article of FIG. 3.
Figure 5:
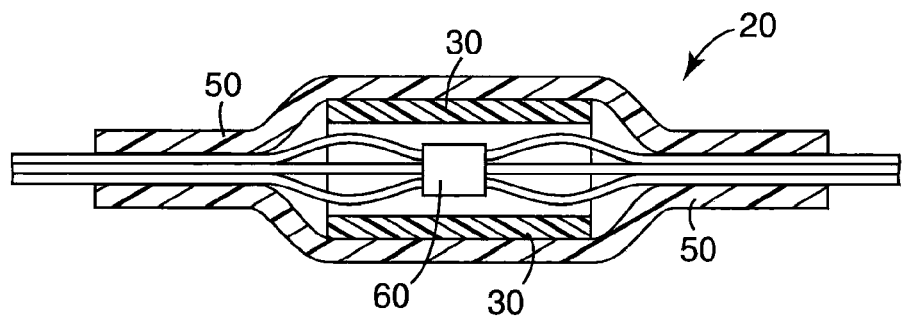
FIG. 5 is a sectional view of the article of FIG. 3 according to an alternative embodiment of the invention.
Figure 6:
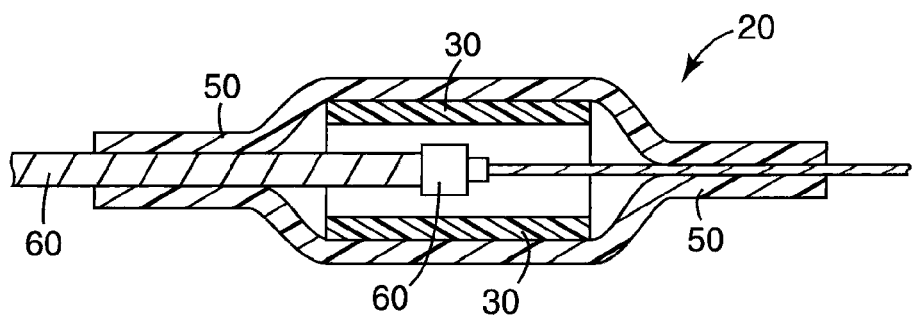
FIG. 6 is a sectional view of the article of FIG. 3 according to an alternative embodiment of the invention.

An article is provided that includes a protective core, a support core, and a cold shrinkable material that is held in an expanded state over the support core prior to removal or withdrawal of the support core.

The structure of each of the support core, the protective core, and the cold shrinkable material can feature a hollow body that is generally tubular in shape. For example, the tubular structure of the support core, the protective core, and the cold shrinkable material can be preferably cylindrical in character, but can also have alternative tubular shapes as well. Such alternative tubular shapes can include, but are not limited to, tubular triangular shapes, tubular rectangular shapes, tubular pentagonal shapes, tubular hexagonal shapes, tubular octagonal shapes, or other suitable tubular shapes, as understood by those skilled in the art.

FIGS. 1-6 illustrate exemplary embodiments of the article 20. The article 20 can include, for example, a protective core 30 having two end portions. The protective core 30 can be made from polymers, plastics, metals, or other suitable materials capable of protecting an apparatus 60. The protective core 30 is generally strong, resilient, and durable to provide impact resistance from environmental forces or conditions and to generally protect an apparatus 60 disposed inside the protective core 30. For example, an apparatus 60 having sharp edges or other deformations (such as resulting from crimping) may be disposed within the protective core 30, in which case the protective core 30 can be strong enough to ensure that the sharp edges or other deformations of the apparatus 60 (such as resulting from crimping) don't fracture or otherwise impair the structure of the cold shrink material 50 and/or the protective core 30. The protective core 30 can also withstand external environmental effects or external mechanical forces that are imparted upon the protective core 30. The protective core 30 can exhibit characteristics that pass the standard defined by UL486D-Sequence D test method, known by some skilled artisans as a form of "drop test." Other alternative tests, as understood by those skilled in the art, may further reveal the benefits and advantages of the protective core 30 as it protects an apparatus 60.

Embodiments of the invention can include, for example, a number of support cores 40. Each support core 40 can be positioned substantially adjacent each end portion of the protective core 30. For example, as shown in FIGS. 1-6, the protective core 30 has a first end portion and a second end portion. A first support core 40 can be positioned substantially adjacent the first end portion of the protective core 30. A second support core 40 can be positioned substantially adjacent the second end portion of the protective core 30. Each support core 40 operates to hold a cold shrinkable material 50 in an expanded state at least until the support core 40 is removed from the cold shrinkable material 50.

The support core 40 can be various shapes and various sizes optionally employed for suitable handling, and typically exhibits some degree of formability and flexibility so as not to become too rigid in application. Embodiments of the support core 40 can be made from, for example, polymers, plastics, metals, or other suitable materials capable of holding a cold shrinkable material 50 in an expanded state.

The support core 40 can include, for example, a removable support core such as a cylindrical support composed of a spirally wrapped ribbon. A cylindrical removable support core is prepared by integrally forming a plastic ribbon in a spiral shape to provide a cylindrical body. The cylindrical support body may also be formed by another method in which the external surface of a hollow cylinder is spirally severed, grooved, perforated, or otherwise cut. Some embodiments may include adjacent spiral ribbon portions bonded or held in a temporary bonded state at the cut portion. The cylindrical support has sufficient strength to hold a cold shrinkable material 50 in an expanded state. The removable support core 40 including a spirally wrapped ribbon can be unwrapped by successively unfastening one spiral ribbon portion from the next adjacent spiral ribbon portion along spirally formed grooves by manually withdrawing one end of the plastic ribbon. In order to facilitate operation of withdrawing or removing the removable support core 40 from the cold shrinkable material 50, for example, one end portion of the removable support core 40 may include a tab 45 that is long enough to be pulled manually to withdraw or remove the removable support core 40. Embodiments can feature the tab 45 as originating at one end of the cylindrical support, passing through the interior of the removable support core 40, and projecting out from the opposite end of the cylindrical support.

Alternatively, the support core 40 can also include, for example, a removable support core such as a cylindrical slide-out support that operates as a single unitary member that can slide out from the cold shrinkable material. Examples of a slide-out support core 40 can include a solid core made of a material such as plastic, and which can also include an additional mylar layer or similar material that allows the support core 40 to slide longitudinally as it is removed from the cold shrinkable material 50.

Alternatively, the support core 40 can also include, for example, a crushable support core such as a frangible support that is not to be removed from the cold shrinkable material 50. The crushable support core shrinks in diameter in response to an operator crushing the frangible sections of the crushable support core, as understood by those skilled in the art. Examples of crushable cores can include a material that has a mesh pattern that is embedded with a mastic, and the connections in the mesh of the crushable core can break responsive to compression by an operator, thereby causing the crushable core to shrink in diameter.

Embodiments of the invention can include, for example, at least one cold shrinkable material 50 held in an expanded state over at least a portion of the protective core 30 and at least a portion of each support core 40. In this manner, the outside surface of the protective core 30 and each support core 40 interface with the inside surface of the cold shrinkable material 50.

The cold shrinkable material 50, as generally understood by persons having ordinary skill in the art, can be any material of tubular character that is capable of being held in an expanded state by a support structure and which shrinks in diameter when the support structure is removed from the cold shrinkable material 50. For example, the cold shrinkable material 50 can be made from a rubber material, a thermoplastic elastomer, or other suitable material demonstrating cold shrink properties (such as being capable of elongation greater than 100% and permanent set less than 30%), as understood by those skilled in the art. Examples of suitable rubber materials include, but are not limited to, silicone rubber, EPDM (ethylene-propylene-diene copolymer), IR, SBR, CR, IIR, NBR, hydrogenated NBR, acrylic rubber, ethylene acrylic rubber, rubber material having fluoroelastomer fillers, or rubber material having epichlorohydrin fillers. Examples of suitable thermoplastic elastomers include, but are not limited to, plastic materials, olefin thermoplastic elastomers, styrene thermoplastic elastomers such as SBS (styrene-butadiene block copolymers), and SEBS (styrene-ethylene butylene-styrene copolymers). In order to improve the properties of the cold shrinkable material 50, various additives, agents, and/or fillers may be included such as, for example, coloring agents, flame retardants, lubricants, processing aides, fillers, softening agents, antistatic agents, crosslinking agents, crosslinking aides in proper amounts. Embodiments of the cold shrinkable material 50 can exhibit desirable characteristics of good tear strength, heat resistance, fluid resistance, transparency, and other features as understood by those skilled in the art.

The cold shrinkable material 50, when in a relaxed state before installation, preferably has an inner diameter that is less than the outer diameter of the protective core 30 and the support core 40 and also that is less than or substantially equal to at least a portion of the apparatus 60 to which it is to be applied, as understood by those skilled in the art.

For example, as shown in FIGS. 1-6, the cold shrinkable material 50 can be a single unitary member that surrounds the entire outer surface of the protective core 30 and portions of each of the support cores 40. The single unitary cold shrink member can be beneficial in those applications in which the protective core 30 has a relatively short length.

Also, for example, as shown in FIGS. 7-10, the cold shrinkable material 50 can be a number of separate cold shrinkable members. In this embodiment, each cold shrinkable member can surround an end portion of the protective core 30 and a portion of the corresponding adjacent support core 40. In this case, although the end portions of the protective core 30 are covered or surrounded with a cold shrinkable member, a center portion of the protective core 30 can be free from any cold shrinkable material 50. This embodiment shown in FIGS. 7-10 can be beneficial in those applications in which the protective core 30 has a relatively long length.

Figure 11:
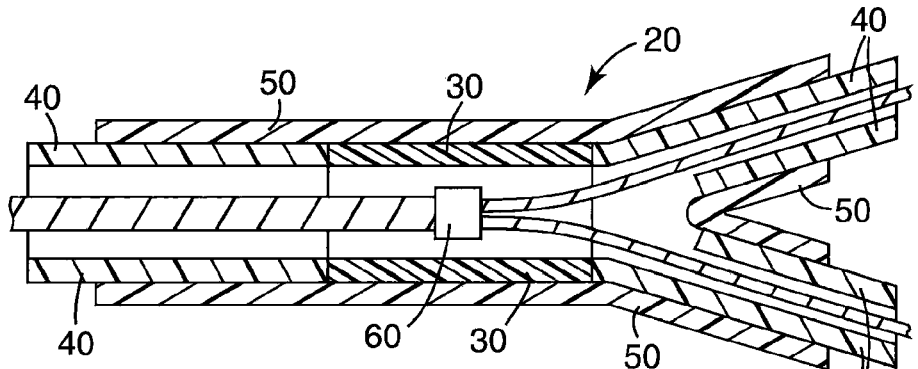
FIG. 11 is a sectional view of an article prior to operation according to an alternative embodiment of the invention.
Figure 12:
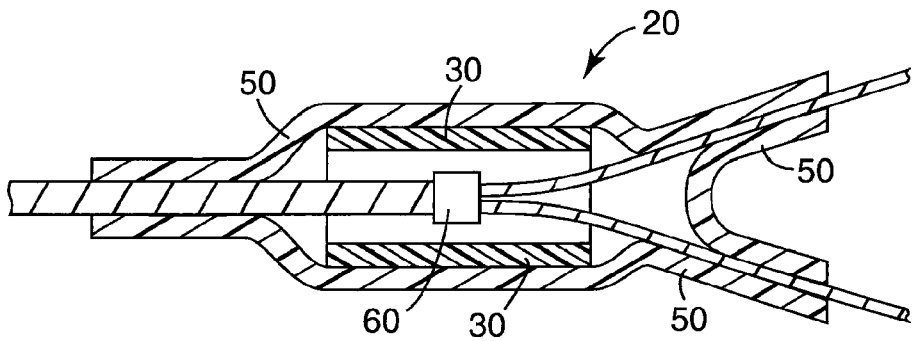
FIG. 12 is a sectional view of an article upon operation according to an alternative embodiment of the invention.
Figure 7:
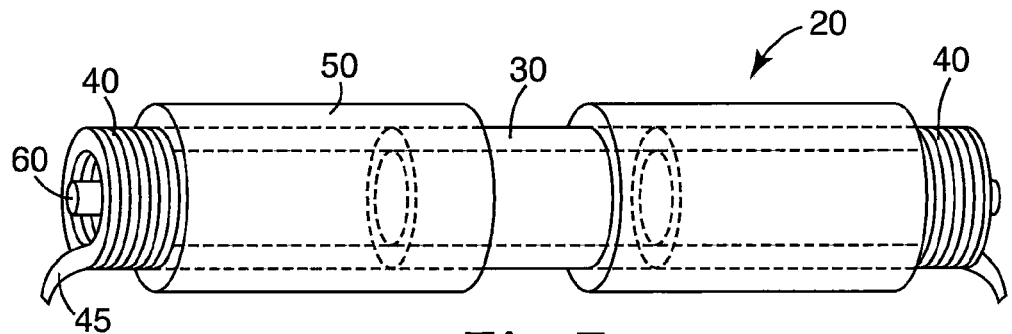
FIG. 7 is an isometric view of an article prior to operation according to an embodiment of the invention.
Figure 8:
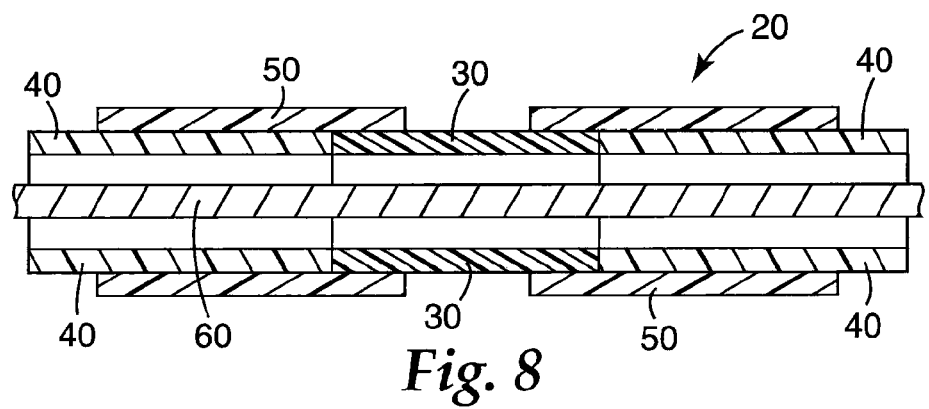
FIG. 8 is a sectional view of the article of FIG. 7.
Figure 9:
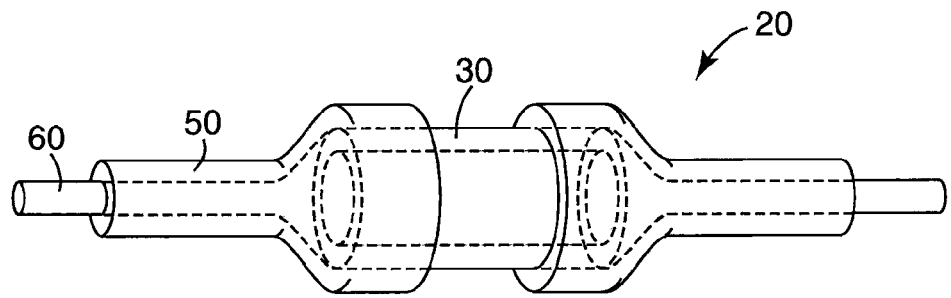
FIG. 9 is an isometric view of an article upon operation according to an embodiment of the invention.
Figure 10:
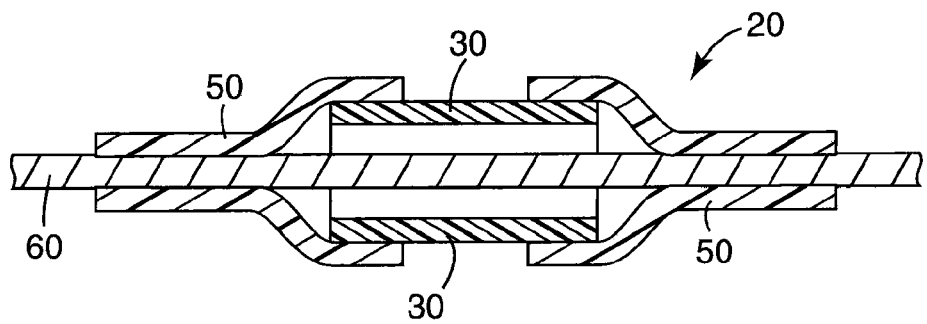
FIG. 10 is a sectional view of the article of FIG. 9.
Figure 13:
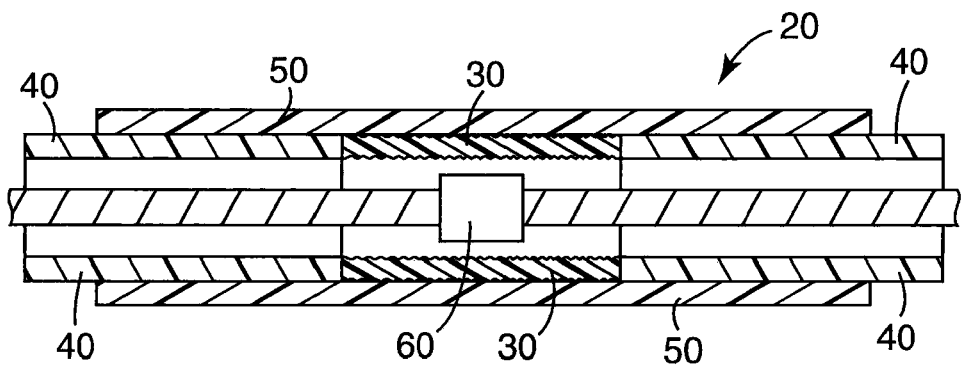
FIG. 13 is a sectional view of an article prior to operation according to an alternative embodiment of the invention.
Figure 14:
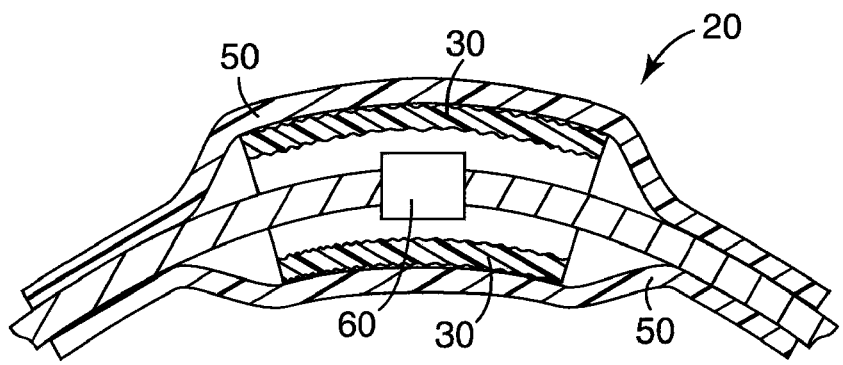
FIG. 14 is a sectional view of an article upon operation according to an alternative embodiment of the invention.
Figure 15:
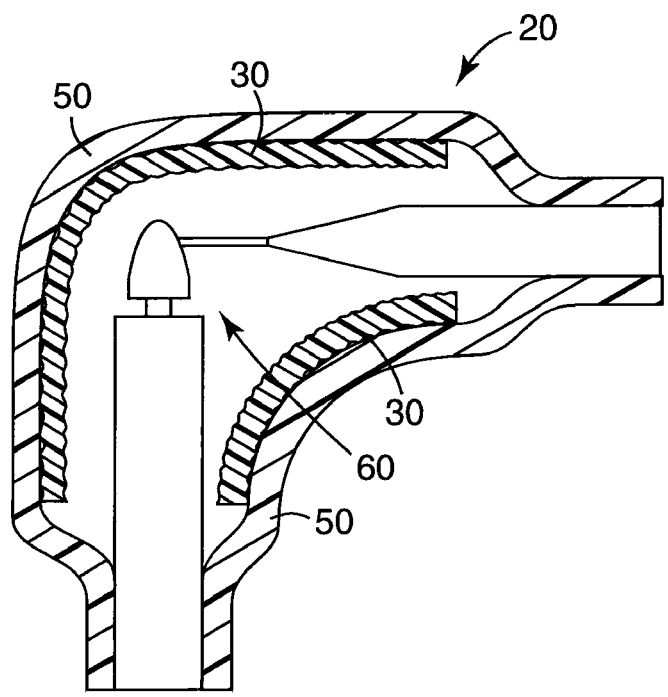
FIG. 15 is a sectional view of an article upon operation according to an alternative embodiment of the invention.
Figure 16:
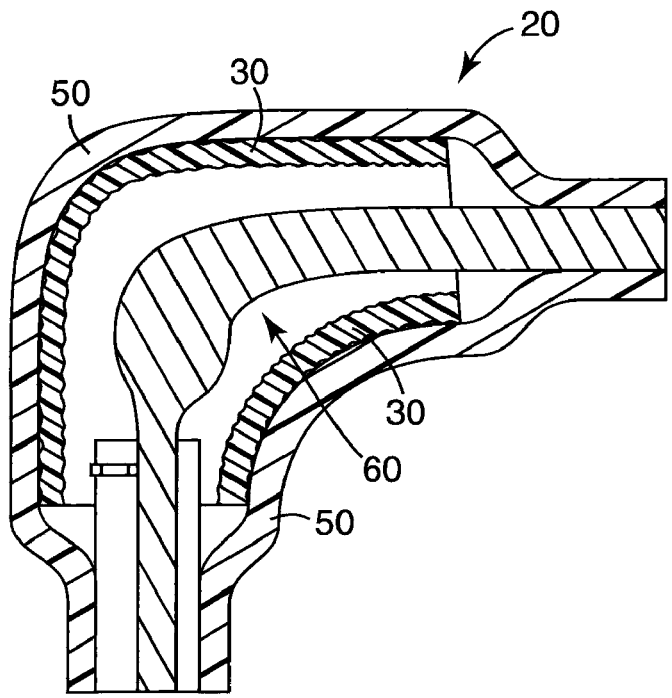
FIG. 16 is a sectional view of an article upon operation according to an alternative embodiment of the invention.

Alternatively, for example, on at least one side of the protective core 30, the cold shrinkable material 50 can include a structure having multiple tubular formations, for example, as shown in FIGS. 11-12.

Also, for example, embodiments of the cold shrinkable material 50 can be scrunched onto a portion of the support core 40 to allow more room for expansion of the cold shrinkable material 50 when applied during operation, as understood by those skilled in the art. Examples of embodiments of cold shrinkable material that can be scrunched onto a portion of a support core are included in U.S. Pat. No. 6,911,596, which is hereby incorporated by reference.

In yet another aspect of the invention, as shown for example in FIGS. 13-16, the protective core can be corrugated to provide various advantages associated with the properties of corrugated materials. The protective core can also be, for example, flexible and/or bendable for use in various applications, such as for example, sealing of secondary distribution connections, buss connections, cable-to-buss connections, terminations, pedestal connections, and any other applications featuring unique geometries of an apparatus to be installed within the article.

The support cores 40, the protective core 30, and the cold shrinkable material 50 can collectively form a single unit to be applied to an apparatus 60 installed through the tubular portions of the article 20. After the support cores 40 are withdrawn or removed from the tubular cold shrink material, the protective core 30 and the cold shrinkable material 50 can collectively form a single unit to provide protection and/or sealing for an apparatus 60 that is installed through the tubular portions of the article 20.

In operation, the support cores 40, the protective core 30, and the cold shrinkable material 50 can be collectively placed over an apparatus 60 such that the cold shrinkable material 50 tightens over a portion of the apparatus 60 responsive to removing or withdrawing the support core 40 from the cold shrink material.

In particular, in reference to FIGS. 1-4, for example, an apparatus 60 can be inserted through the tubular portions of the cold shrinkable material 50, the support core 40, and the protective core 30. One of the support cores 40 on one side of the protective core 30 can be removed from the cold shrinkable material 50, thereby shrinking and securing the cold shrinkable material 50 around the apparatus 60, as understood by those skilled in the art. Another of the support cores 40 on the other side of the protective core 30 can be removed from the cold shrinkable material 50, thereby shrinking and securing the cold shrinkable material 50 around the apparatus 60, as understood by those skilled in the art. The unremoved protective core 30 remains disposed within the cold shrinkable material 50 even after all of the support cores 40 have been removed from the cold shrinkable material 50. This process of removing the support core 40 from the cold shrinkable material 50 can be performed to all support cores 40 on the article 20, until all support cores 40 have been removed and each cold shrinkable material 50 has been shrunk down and tightly secured over each respective portion of the apparatus 60. Each support core 40, for example, can be removed in a manner such that the support core 40 does not pass through any portion of the protective core 30.

Upon the operation of removing or withdrawing the support core 40 from the cold shrink material, the protective core 30 can essentially remain within the cold shrink material after the cold shrink material has tightened over the apparatus 60 to define a nonremovable or unremoved protective core 30. In this manner, the nonremovable or unremoved protective core 30 can remain in contact with at least a portion of the tubular cold shrink material to protect portions of the apparatus 60 contained within the article 20.

Examples of an apparatus 60 that may be employed within the tubular portions of the article 20 include, but are not limited to, cables and wires for electrical applications, fibers for telecommunications applications, cords, pipes, branched cables, barrier boots, splices, conduit joints, secondary distribution connections, buss connections, cable-to-buss connections, pedestal connections, 3-core cables, coax cables, coax connectors, lugs, bolts, hardware, kerneys, irrigation components, pin and sleeve components, and any other form of apparatus 60 that may need sealing from cold shrink and/or protection from a protective core.

Optionally, between removing the first support core 40 and removing the last support core 40, an operator can substantially fill the open space between the inner diameter of the protective core 30 and the apparatus 60 with an encapsulant 70. The encapsulant 70 is not a required feature, but rather an optional feature that can be utilized when desired. As demonstrated in the embodiment of FIGS. 17-18, before the last support core 40 is removed, sufficient space can exist between the support core 40 and the apparatus 60 to allow for insertion of an encapsulant 70 that fills the space between the protective core 30 and the apparatus 60. Preferably the encapsulant 70 would fill any spaces via principles of gravity, and any displaced air would escape from the interior of the article 20 through the open portion between the last support core 40 and the apparatus 60. When the space between the protective core 30 and the apparatus 60 is substantially filled with the encapsulant 70, the last support core 40 can be removed or withdrawn from the cold shrinkable material 50, thereby shrinking and securing the cold shrinkable material 50 around the apparatus 60 and trapping the encapsulant 70 within the interior of the article 20.

Figure 17:
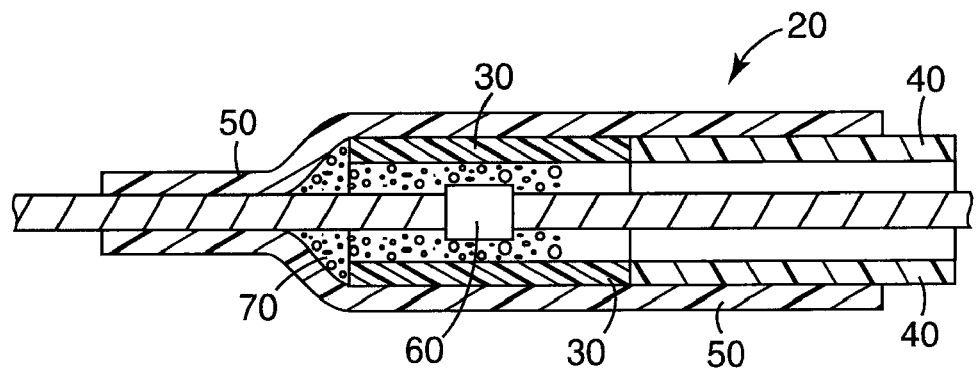
FIG. 17 is a sectional view of an article during operation including installation of an encapsulant material according to an embodiment of the invention.
Figure 18:
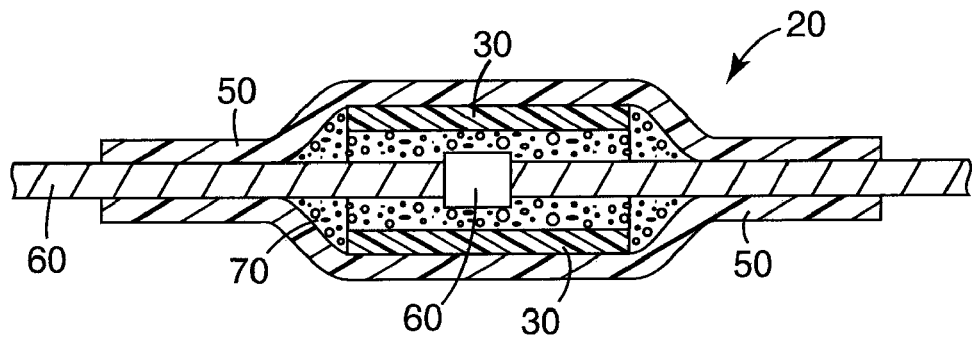
FIG. 18 is a sectional view of the article of FIG. 17 upon operation including installation of an encapsulant material.
Figure 19:
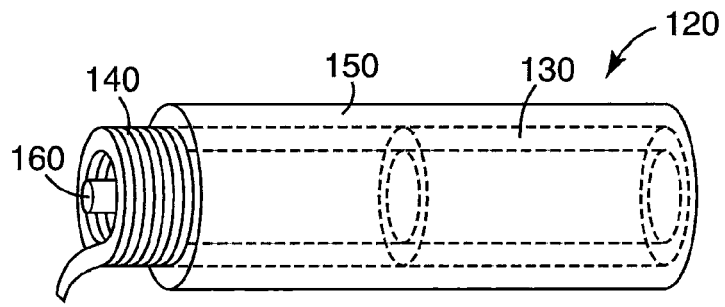
FIG. 19 is an isometric view of an article prior to operation according to an embodiment of the invention.
Figure 20:
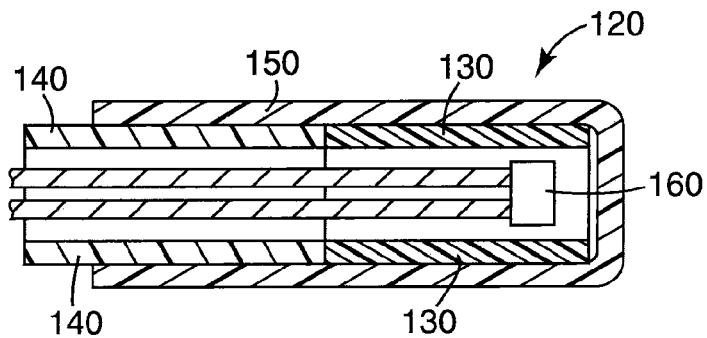
FIG. 20 is a sectional view of the article of FIG. 19.
Figure 21:
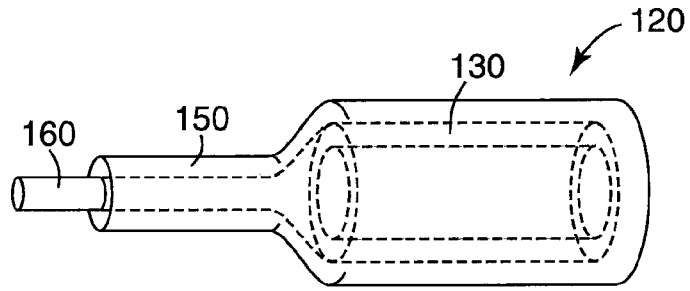
FIG. 21 is an isometric view of an article upon operation according to an embodiment of the invention.
Figure 22:
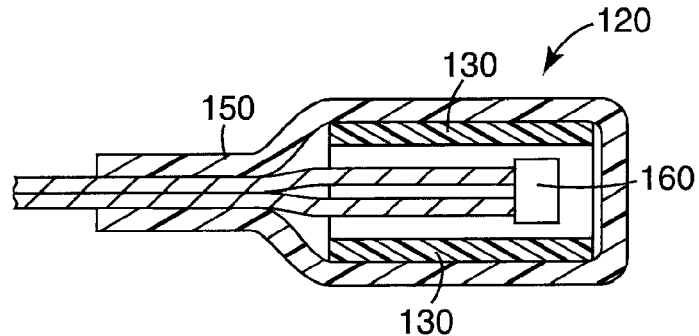
FIG. 22 is a sectional view of the article of FIG. 21.

The encapsulant 70 that is shown in FIGS. 17-18 can include various embodiments. For example, the encapsulant 70 can include curable composition or curable systems, or alternatively greases or gels that do not require curing.

Examples of curable composition or curable systems can include thermal curable or thermoset encapsulants, radiation curable encapsulants, water curable encapsulants, or other types of curable encapsulants. Thermal curable or thermoset encapsulants can include resin compositions such as epoxy, polyurethane, polyester, acrylate, or other types of resins that demonstrate a degree of hardness after curing or setting. Other curable compositions can include embodiments of curable gels that are in liquid form during injection or installation, whereby curing takes place after the curable gel is injected or installed within the tubular portions of the article. Curable gel compositions can be capable of making a physical transformation from a liquid to a rubbery gel semi-solid that the user can cure to form a rubber hydrophobic gel sealant. In addition, some curable compositions can provide moisture protection which may offer advantages in particular applications.

Alternatively, the encapsulant 70 can include gel compositions that do not require curing. For example, the encapsulant 70 can be a pre-formed soft oil-filled rubber hydrophobic gel sealant. Embodiments of this soft oil-filled rubber hydrophobic gel sealant can include, for example, at least a polymer and an oil portion, such as a polymeric hydrophobic rubber gel sealant including at least a portion of oil. Examples of polymers that are useful can include oil-filled silicones, polyurethanes, polyesters, polyepoxys, polyacrylates, polyolefins, polysiloxanes, polybutadienes (including polyisoprenes), and hydrogenated polybutadienes and polyisoprenes, as well as copolymers, including block copolymers and graft copolymers.

As another alternative, the encapsulant 70 can include grease compositions that do not require curing. The grease composition can include, for example, a thickener cooperating with at least a portion of oil. The grease composition can provide the properties of low shear yield point and higher adhesion than cohesion. The thickener can include, for example, an organic polymeric composition. The organic polymeric composition can include, for example, polymers including polyurethanes, polyesters, polyepoxys, polyacrylates, polyolefins, polysiloxanes, polybutadienes (including polyisoprenes) and hydrogenated polybutadienes and polyisoprenes, as well as block copolymers. The blocks of the block copolymers can include, for example, the above polymers and poly(monoalkenylarenes) including polystyrene. These bock copolymers can include particularly SEB (Styrene, ethylene-butylene), SEP (Styrene, ethylene-propylene), SEBS (Styrene, ethylene-butylene, Styrene), SEPS (Styrene, ethylene-propylene, Styrene), similar Styrene-rubber polymers, di-block, graft- and star-block copolymers, and block copolymers with blocks which are non-homogeneous. Alternatively, for example, the thickener can include an inorganic sol composition. The inorganic sol composition can include, for example, alumina, silica, or clay. Alternatively, for example, the thickener can include a soap composition. The soap composition can include, for example, metal complex soaps, aluminum complex soaps, lithium complex soaps, or calcium complex soaps. Also, for example, the thickener can be other types of greases, waxes (including polyethylene and polypropylene waxes), or viscoelastic polymeric hydrophobic compositions including at least a portion of oil.

FIGS. 19-22 illustrate another exemplary embodiment of the article 120, in which the protective core 130, the support core 140, and the cold shrinkable material 150 can be made from the same materials and can exhibit the same characteristics as in the aforementioned embodiments disclosed herein. The embodiment of FIGS. 19-22 can include end cap formations or a type of structure utilized for cable end protection.

The article 120 can include, for example, a protective core 130 having two end portions. The article 120 can also include, for example, a support core 140 positioned substantially adjacent a first end portion of the protective core 130.

Embodiments can also include a cold shrinkable material 150 held in an expanded state over the protective core 130 and a portion of the support core 140. As shown in FIGS. 19-22, the cold shrinkable material 150 can surround the first end portion of the protective core 130 and a portion of the support core 140, thereby defining an open end portion of the article 120. Also, the cold shrinkable material 150 can surround and enclose a second end portion of the protective core 130, thereby defining a closed end portion of the article 120. In this manner, the cold shrinkable material 150 may need to be pre-formed to be the proper shape such that the cold shrinkable material 150 can cooperate with the protective core 130 to establish a tight cover at the second end portion of the protective core 130.

In operation, the support cores 140, the protective core 130, and the cold shrinkable material 150 can be collectively placed over an apparatus 160 such that the cold shrinkable material 150 tightens over a portion of the apparatus 160 responsive to removing or withdrawing the support core 140 from the cold shrinkable material 150.

In particular, in reference to FIGS. 19-22, for example, an apparatus 160 can be inserted through the open end portion of the article 120 through the tubular portions of the cold shrinkable material 150, the support core 140, and the protective core 130. The support core 140 at the open end portion of the article 120 can be removed from the cold shrinkable material 150, thereby shrinking and tightly securing the cold shrinkable material 150 around the apparatus 160, as understood by those skilled in the art. The protective core 130 can remain disposed within the cold shrinkable material 150 even after the support cores 140 have been removed from the cold shrinkable material 150. Each support core 140, for example, can be removed in a manner such that the support core 140 does not pass through any portion of the protective core 130.

Upon the operation of removing or withdrawing the support core 140 from the cold shrink material, the protective core 130 can essentially remain within the cold shrink material after the cold shrink material has tightened over the apparatus 160 to define a nonremovable or unremoved protective core 130. In this manner, the nonremovable or unremoved protective core 130 can remain in contact with at least a portion of the tubular cold shrink material to protect portions of the apparatus 160 contained within the article 120.

Examples of an apparatus 160 that may be employed within the tubular portions of the article 120 of FIGS. 19-22 include, but are not limited to, connectors, cable ends, lugs, butt splices, or other suitable devices.

Figure 23:
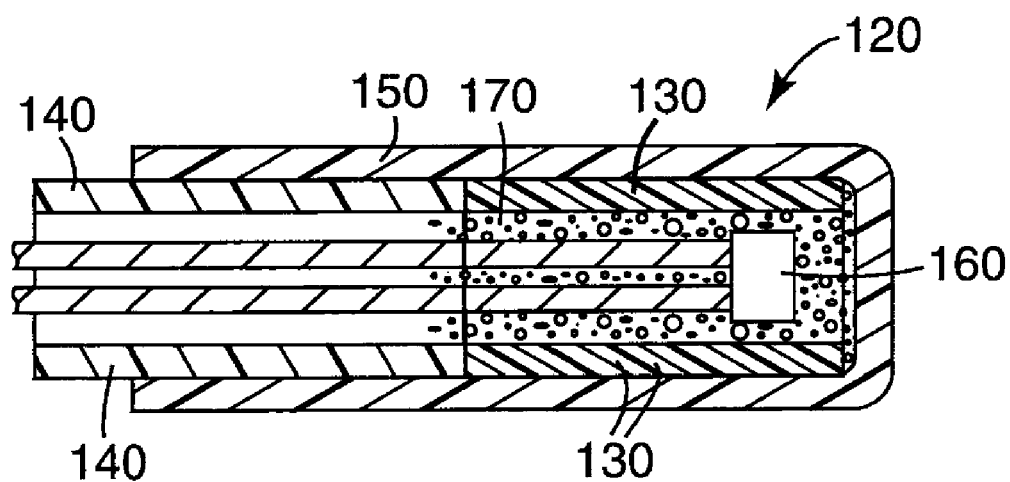
FIG. 23 is a sectional view of an article during operation including installation of an encapsulant material according to an embodiment of the invention.
Figure 24:
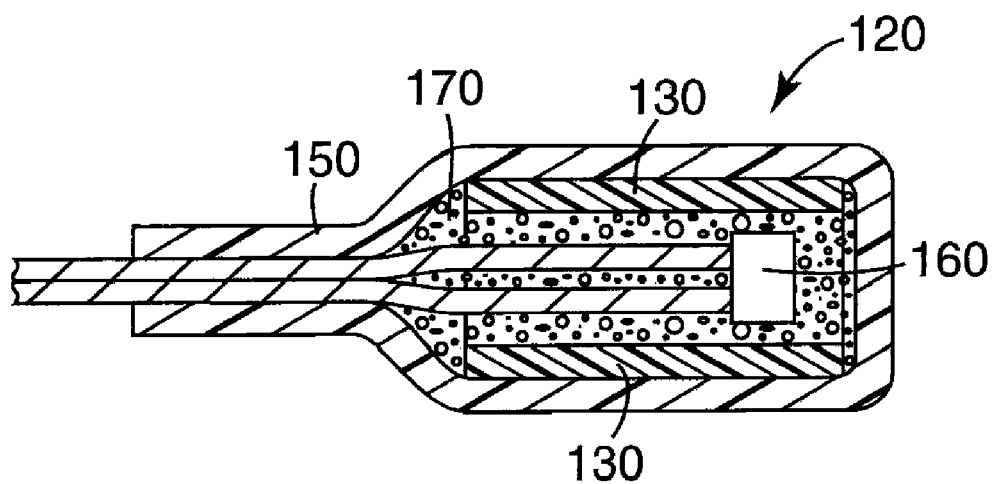
FIG. 24 is a sectional view of the article of FIG. 23 upon operation including installation of an encapsulant material.

Optionally, before removing the support core 140 from the open end portion of the article 120, an operator an operator can substantially fill the open space between the inner diameter of the protective core 130 and the apparatus 160 with an encapsulant 170. The composition and/or characteristics of the encapsulant 170 described herein above in other aspects or embodiments are similarly applicable in this embodiment. As demonstrated in the embodiment of FIGS. 23-24, before the support core 140 is removed from the open end portion of the article 120, sufficient space can exist between the support core 140 and the apparatus 160 to allow for insertion of an encapsulant 170 that fills the space between the protective core 130 and the apparatus 160. Preferably the encapsulant 170 would fill any spaces via principles of gravity, and any displaced air would escape from the interior of the article 120 through the open portion between the support core 140 at the open end portion of the article 120 and the apparatus 160. When the space between the protective core 130 and the apparatus 160 is substantially filled with the encapsulant 170, the support core 140 at the open end portion of the article 120 can be removed or withdrawn from the cold shrinkable material 150, thereby shrinking and securing the cold shrinkable material 150 around the apparatus 160 and trapping the encapsulant 170 within the interior of the article 120.

All of the various embodiments of the article can offer important advantages, For example, the protective core exhibits a strength, resiliency, and durability that can enhance protection of an apparatus disposed within the article inside the protective core. The protective core is generally not susceptible to the type of splitting, breaking, and cracking that sometimes occurred with prior cold shrink articles when a sharp edges or other deformations of an apparatus (such as resulting from crimping) was inserted or installed inside the cold shrink article. In this manner, the protection offered by the protective core substantially prevents such splitting, breaking, and cracking of the cold shrinkable material. The protective core also can generally withstand external environmental effects or external mechanical forces imparted onto the protective core. In this manner, embodiments potentially can, for example, pass the drop test articulated by the UL486D-Sequence D standard. Further, embodiments can also potentially provide for easier installation as compared to other existing cold shrink articles.

Additionally, for example, the existence of the protective core can prevent the removable protective core from "catching" on a portion of the apparatus inside the article, which is sometimes referred to as "hang up" (as understood by those skilled in the art). Such "hang up" has sometimes occurred in prior cold shrink articles as a result of having to pull the spirally wound ribbon of the removable core the entire length of the cold shrink article to unwind or withdraw the spirally wound ribbon from one end portion of the article to the other end portion of the article without a break in continuity.

All various types of embodiments of the article can be used in various industries and in various applications. Embodiments can be utilized, for example, in the electrical industry for protecting cables or other apparatus, telecommunications industry for protecting fibers or other apparatus, automotive industry, irrigation industry, mining industry, utilities industry, energy industry, construction industry, and any other industry that may benefit from the increased protection provided by the protective core and the cold shrinkable material. Applications of the article can include utilization for rejacketing a cable or series of cables, terminating a cable or series of cables, grounding connections, antenna connections, industrial pin and sleeve connections. Exemplary applications can include, but are not limited to, branch applications, resin applications, barrier boot applications, mining cable splice applications, conduit joint seal applications, floodseal applications, end cap sealing applications, cellular tower applications including cellular tower grounding connector sealing applications and/or cellular tower splice applications, electrical box applications, insulating hardware including lugs/bolts, kerney applications, pedestal connection applications, irrigation applications, lighting applications such as airport lighting and/or street lighting, as well as many other applications for which the article is suitable.

Although the aforementioned detailed description contains many specific details for purposes of illustration, anyone of ordinary skill in the art will appreciate that many variations, changes, substitutions, and alterations to the details are within the scope of the invention as claimed. Accordingly, the invention described in the detailed description is set forth without imposing any limitations on the claimed invention. For example, any reference to terms such as mounted, connected, attached, joined, coupled, etc. should be construed broadly so as to include such mounting, connecting, attaching, joining, coupling, etc. as having been achieved indirectly, directly, and/or integrally. The proper scope of the invention should be determined by the following claims and their appropriate legal equivalents.

The invention claimed is:

1. An article of manufacturing comprising:
a protective core having at least two end portions;
a plurality of support cores, each support core positioned substantially adjacent each end portion of the protective core; and
at least one cold shrinkable material held in an expanded state by at least a portion of the protective core and at least a portion of each support core;
the support cores, the protective core, and the cold shrinkable material collectively adapted to be placed over an apparatus such that the cold shrinkable material adjacent the protective core tightens over a portion of the apparatus responsive to removing the support core from the cold shrinkable material, the cold shrinkable material remaining expanded over the protective core.

2. The article as defined by claim 1, wherein the cold shrinkable material is a singular unitary member that surrounds the entire outer surface of the protective core and portions of each of the support cores.

3. The article as defined by claim 1, wherein the at least one cold shrinkable material comprises a plurality of separate cold shrinkable members that each surround an end portion of the protective core and a portion of the corresponding adjacent support core.

4. The article as defined by claim 1, wherein the support cores comprise a removable support core or a crushable support core.

5. The article as defined by claim 1, wherein, on at least one side of the protective core, the cold shrinkable material comprises multiple tubular formations.

6. The article as defined by claim 1, wherein the cold shrinkable material is scrunched onto a portion of the support core.

7. The article as defined by claim 1, wherein the protective core is flexible and bendable.

8. The article as defined by claim 1, wherein the protective core is corrugated.

9. The article as defined by claim 1, further comprising an encapsulant adapted to be positioned between the inner diameter of the protective core and the apparatus.

10. The article as defined by claim 9, wherein the encapsulant comprises a curable composition.

11. The article as defined by claim 9, wherein the encapsulant comprises a conformable material.

12. The article as defined by claim 1, wherein the article exhibits characteristics passing the standard defined by UL486D-Sequence D.

13. An article of manufacture comprising:
a protective core having at least two end portions;
a support core positioned substantially adjacent a first end portion of the protective core; and
a cold shrinkable material held in an expanded state by at least a portion of the support core and the first end portion of the protective core to define an open end portion of the article, the cold shrinkable material surrounding and enclosing a second end portion of the protective core to define a closed end portion of the article;
the cold shrinkable material, the support core, and the protective core collectively adapted to receive an apparatus through the open end of the article such that the cold shrinkable material tightens over a portion of the apparatus adjacent the protective core responsive to removing the support core from the cold shrinkable material, the cold shrinkable material remaining expanded over the protective core.

14. The article as defined by claim 13, wherein the cold shrinkable material is a singular unitary member that surrounds the entire outer surface of the protective core and portions of each of the support cores.

15. The article as defined by claim 13, wherein the support core comprises a removable support core or a crushable support core.

16. The article as defined by claim 13, wherein, on at least one side of the protective core, the cold shrinkable material comprises multiple tubular formations.

17. The article as defined by claim 13, wherein the cold shrinkable material is scrunched onto a portion of the support core.

18. The article as defied by claim 13, wherein the protective core is flexible and bendable.

19. The article as defined by claim 13, wherein the protective core is corrugated.

20. The article as defined by claim 13, further comprising an encapsulant adapted to be positioned between the inner diameter of the protective core and the apparatus.

21. The article as defined by claim 20, wherein the encapsulant comprises a curable composition.

22. The article as defined by claim 20, wherein the encapsulant comprises a conformable material.

23. The article as defined by claim 13, wherein the article exhibits characteristics passing the standard defined by UL486D-Sequence D test method.

24. A method comprising:
(a) providing an article comprising:
   a protective core having at least two end portions;
   a plurality of support cores, each support core positioned substantially adjacent each end portion of the protective core; and
   at least one cold shrinkable material held in an expanded state by at least a portion of the protective core and at least a portion of each support core;
(b) inserting an apparatus through the tubular portions of the cold shrinkable material, the support core, and the protective core;
(c) removing at least one of the support cores on one side of the protective core from the cold shrinkable material, thereby shrinking and securing the cold shrinkable material adjacent the protective core around the apparatus; and
(d) removing at least one of the support cores on the other side of the protective core from the cold shrinkable material, thereby shrinking and securing the cold shrinkable material adjacent the protective core around the apparatus, the cold shrinkable material remaining expanded over the protective core.

25. The article as defined by claim 24, further comprising using the article for rejacketing at least one cable.

26. The article as defined by claim 24, further comprising using the article for terminating at least one cable.

27. The article as defined by claim 24, further comprising using the article for grounding connections.

28. The article as defined by claim 24, further comprising using the article for antenna connections.

29. The article as defined by claim 24, further comprising using the article for industrial pin and sleeve connections.

30. The article as defined by claim 24, further comprising removing each support core in a manner such that the support core does not pass through any portion of the protective core.

31. The method as defined by claim 24, further comprising:
between performing step (c) and step (d), substantially filling any space between the inner diameter of the protective core and the apparatus with an encapsulant.

32. A method comprising:
(a) providing an article comprising:
   a protective core having at least two end portions;
   a support core positioned substantially adjacent a first end portion of the protective core; and
   a cold shrinkable material held in an expanded state by at least a portion of the support core and the first end portion of the protective core to define an open end portion of the article, the cold shrinkable material surrounding and enclosing a second end portion of the protective core to define a closed end portion of the article;
(b) inserting an apparatus through the open end portion of the article through the tubular portions of the cold shrinkable material, the protective core, and the support core; and
(c) removing the support core at the open end portion of the article from the cold shrinkable material, thereby shrinking and tightly securing the cold shrinkable material adjacent the protective core around the apparatus, the cold shrinkable material remaining expanded over the protective core.

33. The article as defined by claim 32, further comprising using the article for rejacketing at least one cable.

34. The article as defined by claim 32, further comprising using the article for terminating at least one cable.

35. The article as defined by claim 32, further comprising using the article for grounding connections.

36. The article as defined by claim 32, further comprising using the article for antenna connections.

37. The article as defined by claim 32, further comprising using the article for industrial pin and sleeve connections.

38. The article as defined by claim 32, further comprising removing each support core in a manner such that the support core does not pass through any portion of the protective core.

39. The method as defined by claim 32, further comprising:
between performing step (c) and step (d), substantially filling any space between the inner diameter of the protective core and the apparatus with an encapsulant.

* * * * *